United States Patent [19]

Maria et al.

[11] Patent Number: 6,092,110

[45] Date of Patent: *Jul. 18, 2000

[54] APPARATUS FOR FILTERING PACKETS USING A DEDICATED PROCESSOR

[75] Inventors: Arturo Maria, Bellevue; Leslie Dale Owens, Issaquah, both of Wash.

[73] Assignee: AT&T Wireless Svcs. Inc., Redmond, Wash.

[ * ] Notice: This patent issued on a continued prosecution application filed under 37 CFR 1.53(d), and is subject to the twenty year patent term provisions of 35 U.S.C. 154(a)(2).

[21] Appl. No.: 08/956,993

[22] Filed: Oct. 23, 1997

[51] Int. Cl.[7] ............................................. G06F 13/00
[52] U.S. Cl. .................... 709/225; 709/238; 709/250; 713/201
[58] Field of Search .................... 709/217, 218, 709/219, 227, 224, 225, 229, 250, 313, 206, 238; 713/201; 707/9, 10

[56] References Cited

U.S. PATENT DOCUMENTS

| | | | |
|---|---|---|---|
| 4,715,030 | 12/1987 | Koch et al. | 370/85 |
| 4,888,796 | 12/1989 | Olivo, Jr. | 379/101.01 |
| 5,172,111 | 12/1992 | Olivo, Jr. | 386/126 |
| 5,396,493 | 3/1995 | Sugiyama | 370/403 |
| 5,448,698 | 9/1995 | Wilkes | 709/245 |
| 5,481,720 | 1/1996 | Loucks et al. | 364/284.2 |
| 5,561,770 | 10/1996 | de Bruijn et al. | 709/225 |
| 5,606,668 | 2/1997 | Shwed | 380/42 |
| 5,615,340 | 3/1997 | Dai et al. | 709/250 |
| 5,826,014 | 10/1998 | Coley et al. | 713/201 |
| 5,848,233 | 12/1998 | Radia et al. | 713/201 |
| 5,884,025 | 3/1999 | Baehr et al. | 713/201 |

FOREIGN PATENT DOCUMENTS 0 743 777  11/1996  European Pat. Off. .
WO96/13113  5/1996  WIPO .

OTHER PUBLICATIONS

Patent Abstracts of Japan, vol. 097, No. 010, Oct. 31, 1997 & JP 09–152969 A (Kenwood Corp.), Jun. 10, 1997.

Skokowski P.: Penny–Pinching Networks for Distributed Control, Control Engineering, vol. 39, No. 5, Jan. 1992, pp. 35–37.

Andrew S. Tanenbaum: Computer Networks, 1996, Prentice–Hall International, Upper Saddle River, New Jersey, US, pp. 7–16.

*Primary Examiner*—Viet D. Vu

[57] ABSTRACT

A dedicated data packet filtering processor whose only function is to filter data packets based on a list of source IP addresses stored in high-speed memory of the processor. The processor has a specialized operating system which controls the operation of the processor. The processor examines the source IP address of each received data packet to determine if the source IP address matches one of the stored source IP addresses, and if there is a match, either discards or forwards the data packet depending on the processor configuration. The list of source IP addresses are updated by a service provider having a central administrative site. The service provider keeps these lists up to data and periodically updates the source IP addresses stored in the random access memory of the dedicated IP filtering processors.

21 Claims, 4 Drawing Sheets

APPARATUS FOR FILTERING PACKETS USING A DEDICATED PROCESSOR

FIELD OF THE INVENTION

The invention relates to packet filters in general. More particularly, the invention relates to a method and apparatus for filtering data packets using a dedicated processor and a list of source addresses stored in high-speed memory, as well as a means for periodically updating the list of source addresses to ensure the list is kept current.

BACKGROUND OF THE INVENTION

Many companies and individual homes have access to the Internet, and more particularly, the World Wide Web (WWW). With the growing number of Internet sites, there is also a growing number of sites which provide content that some companies may deem inappropriate for the workplace. Similarly, there are many Internet sites which provide content that parents may deem inappropriate for young children.

Data packet filters are currently available which filter out data packets from certain Internet sites. On the commercial side, these filters are often implemented as part of a router or "firewall." On the individual side, these filters are implemented as programs which run on a personal computer and operate in conjunction with individual browser software. Both the commercial and individual filters operate by storing lists of prohibited source addresses, such as Internet Protocol (IP) addresses, and filtering out any data packets received from a site with a prohibited source IP address. One problem with the currently available filters is that there is a performance degradation as the list of prohibited source IP addresses grows. Another problem is the administration of prohibited source IP address lists. Internet sites are being added and changed every day, and it is very difficult to keep a prohibited source IP address list up to date.

One example of a conventional data packet filter is described in U.S. Pat. No. 5,606,668 titled "System for Securing Inbound and Outbound Data Packet Flow in a Computer Network." The '668 patent relates to computer network security and the control of information flow between internal and external network destinations. The patent broadly describes prior art packet filtering using access list tables. The patent is directed to a filter module which provides network security by specifying security rules for network traffic and accepting or dropping data packets according to the security rules. The rules are implemented in packet filter code which is executed by packet filter modules located at various locations within the network.

The packet filter disclosed in the '668 patent, however, is less than satisfactory for a number of reasons. In accordance with the disclosure of the '668 patent, the packet filter modules are embodied as "virtual machines" residing on existing network host computers. Thus, these filters are software modules executing on existing network computers, and are not separate dedicated filtering processors. Further, this patent fails to describe a method for administering and updating the access list tables. In addition, the packet filter disclosed in the '668 patent is implemented between the data link layer and network layer of the International Standardization Organization (ISO) protocol stack as set forth in ISO standard 7498 titled "Basic Reference Model for Open Systems Interconnection" (1984). Therefore, the packets must unnecessarily pass through the protocols set forth for the data link layer before being filtered, which slows down the processing speed of the packet filter.

Another example of a conventional data packet filter is shown in U.S. Pat. No. 5,615,340 titled "Network Interfacing Apparatus and Method Using Repeater and Cascade Interface with Scrambling." The '340 patent relates to interfacing nodes in a network. Each node is associated with a plurality of working ports. When a node receives an incoming data packet, the destination address of the data packet is compared against a stored address table to determine if the data packet is destined for a working port associated with the node. The node will only transmit the data packet to the node's working ports if there is a match. Similarly, when a node receives an outgoing data packet, the destination address of the data packet is compared against the stored address table to determine if the data packet is destined for a working port associated with the node. If there is a match, then the node will transmit the data packet back to its working nodes. Otherwise, the node will transmit the data packet to the network. This system is not used for filtering unwanted data packets, but is instead used for network routing of data packets. Further, as with the '668 patent, the '340 patent fails to disclose a means for updating the source address list.

From the foregoing, it can be appreciated that a substantial needs exists for a high performance data packet filter which can work with a large number of source IP addresses. There is also a need for an efficient way to administer source IP address lists.

SUMMARY OF THE INVENTION

One embodiment of the present invention proposes a dedicated data packet filtering processor whose only function is to filter data packets based on a list of source IP addresses stored in high-speed memory of the processor. The processor has a specialized operating system which controls the operation of the processor. The only function of the processor is to look at the source IP address of each received data packet to determine if the source IP address matches one of the stored source IP addresses, and if there is a match, to either discard or forward the data packet depending on the processor configuration. Since the processor is dedicated to one task, it can perform the filtering process very quickly and efficiently. In various embodiments, the filtering processor may be used in conjunction with a local area network and many end users (such as in a commercial or business environment), or a single end user computer (such as in a home environment). Further, the filtering processor may be connected to the Internet via wired connections or wireless connections, such as a fixed wireless network.

With these and other advantages and features of the invention that will become hereinafter apparent, the nature of the invention may be more clearly understood by reference to the following detailed description of the invention, the appended claims and to the several drawings attached herein.

DETAILED DESCRIPTION

Figure 1:
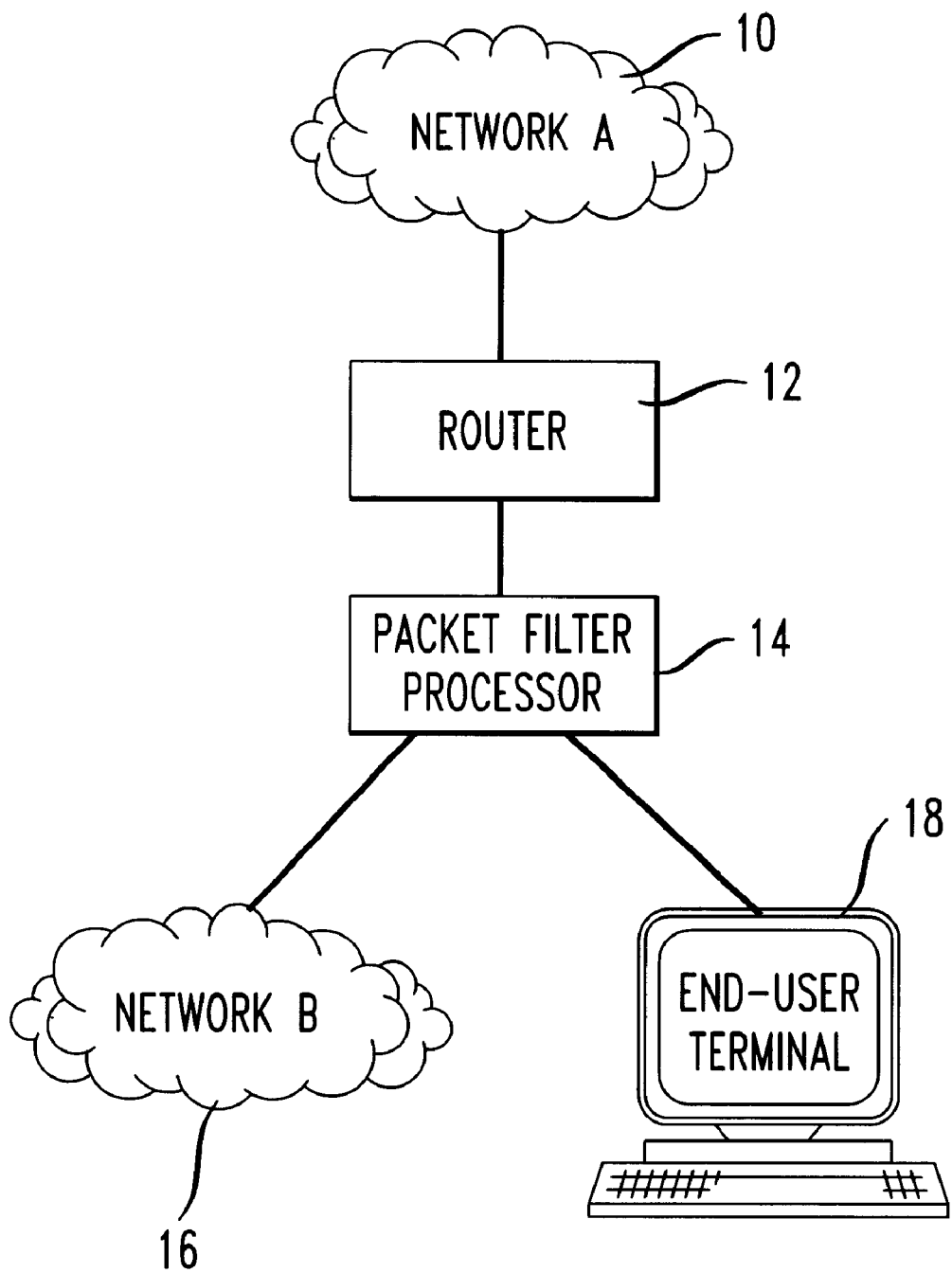
FIG. 1 illustrates a network topology suitable for practicing one embodiment of the invention.

Referring now in detail to the drawings wherein like parts are designated by like reference numerals throughout, there is illustrated in FIG. 1 a network topology suitable for practicing one embodiment of the invention. As shown in FIG. 1, a first network 10 is connected to a router 12. Router 12 is in turn connected to a packet filter processor 14. Packet filter processor 14 is connected to a second network 16 and an end-user terminal 18.

Networks 10 and 16 are packet based networks, such as Transmission Control Protocol/Internet Protocol (TCP/IP) networks or X.25 networks. A packet originates from network 10 with an intended destination to network 16 or end-user terminal 18. Both the source and destination addresses are included in the packet.

It is worthy to note that the network topology shown in FIG. 1 is exemplary only. The possible number of network configurations is virtually limitless, the design of which is well-known in the art. The present invention may work on any network configuration utilizing packet technology for transporting voice, image or data signals.

The placement of packet filter processor 14 in a network is also variable depending on where a network designer would desire to control the in-flow or out-flow of packets between networks or network devices. In this embodiment of the invention, packet filter processor 14 is positioned at the only entry and exit point of either network 10 or 16, thereby controlling which packets enter either network. It can be appreciated, however, that packet filter processor 14 could be placed on an individual network device, such as a personal computer, thereby controlling the flow of packets only to the personal computer, or in any other strategic point within a network.

Figure 2:
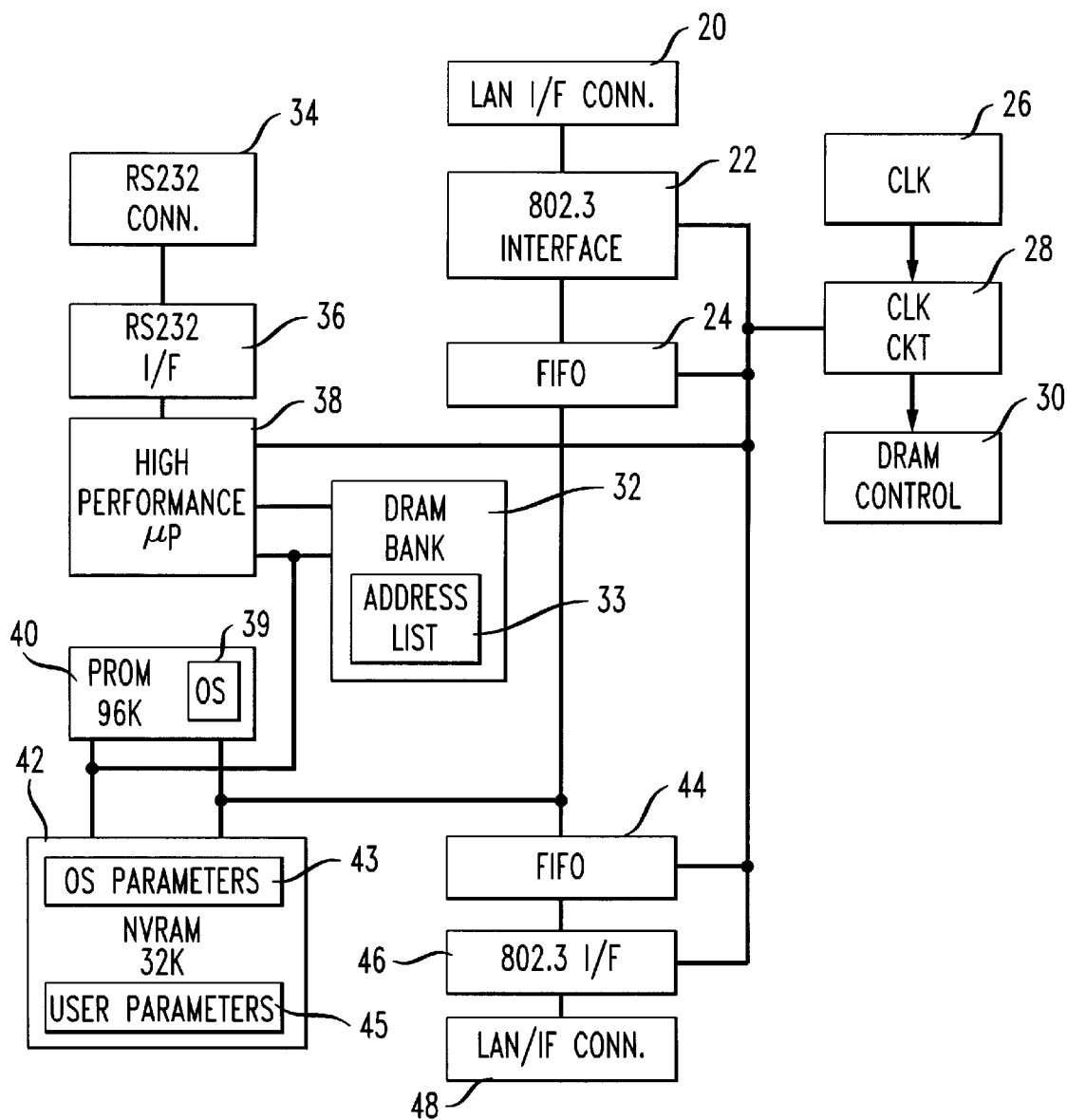
FIG. 2 is a block diagram of a packet filter processor in accordance with one embodiment of the invention.

FIG. 2 is a block diagram of a packet filter processor in accordance with one embodiment of the invention. As shown in FIG. 2, Local Area Network (LAN) interface (I/F) connectors 20 and 48 are coupled to network interface cards 22 and 46, respectively. Connector 20 and card 22 are used to interface with network 10, and to accept packets originating from network 10. Connector 48 and card 46 are used to interface with network 16 or end-user terminal 18, and to accept packets originating from network 16 or terminal 18. Connectors 20 and 48, as well as cards 22 and 46, operate in accordance with principles well-known in the art.

Further, cards 22 and 46 are designed to adhere to the Institute of Electrical and Electronics Engineers (IEEE) standard titled "Carrier Sense Multiple Access with Collision Detection (CSMA/CD) Access Method and Physical Layer Specifications, American National Standard ANSI/IEEE Standard 802.3, 1985 ("IEEE 802.3 standard"). The IEEE 802.3 standard defines a technique referred to as CSMA/CD, which is appropriate for a network having a bus/tree topology. It can be appreciated, however, that network interfaces designed to work with other medium access techniques or standards could be used for packet filter processor 14, and still fall within the scope of the invention.

Cards 22 and 44 are connected to one another, and also to First In First Out (FIFO) buffers 24 and 44, respectively. FIFO buffers 24 and 44 are used to store incoming or outgoing packets in memory until each packet can be compared and sent to networks 10 or 16.

Packet filter processor 14 also includes several types of high-speed memory. By way of example, this embodiment of the invention includes a 96 kilobyte (K) Programmable Read Only Memory (PROM) 40, a 32K Non-Volatile Random Access Memory (NVRAM) 42, and a Dynamic Random Access Memory (DRAM) bank 32. There is also a DRAM control 30 for DRAM bank 32.

Each type of memory is used to store data for packet filter processor 14. For example, PROM 40 is used to store an operating system 39 for packet filter processor 14. NVRAM 42 is used to store user defined parameters 45, and operating system parameters 43 used by the operating system stored in PROM 40. DRAM bank 32 is used to store an address list 33 of source IP addresses.

The heart of packet filter processor 14 is a dedicated high performance microprocessor 38. Any microprocessor capable of operating at the speeds necessary to implement of the functions of the packet filter processor is appropriate. Examples of processors suitable to practice the invention includes the INTEL family of processors, such as the Pentium®, Pentium® Pro, and Pentium® II microprocessors.

Packet filter processor 14 also includes a connector 34 and interface 36, both of which are attached to processor 38. Connector 34 and interface 36 both adhere to Electronic Industries Association (EIA) Standard RS-232-C titled "Interface Between Data Terminal Equipment and Data Communication Equipment Employing Serial Binary Data Interexchange," October, 1969. Finally, packet filter processor 14 includes a clock 26 and clock counter 28 to control the timing of packet filter processor 14.

Packet filter processor 14 operates in accordance with operating system 39, which is comprised of a set of computer program instructions which are stored in PROM 40. Since a list of source IP addresses can include a large number of addresses, e.g., ranging from hundreds to several thousand, the processing time required to compare a source IP address of an incoming packet with a list of several thousand source IP addresses is enormous, and significantly degrades the performance of many conventional packet filters. According to the principles of the present invention, however, packet filter processor 14 combines the elements of a high-speed microprocessor, a source IP address list stored in high-speed memory, and a dedicated proprietary operating system, to ensure that data packets can be filtered at a high-rate of speed.

Operating system 39 is designed to control the operation of the processor. More particularly, operating system 39 is designed such that the processor is directed to look at the source IP address of each received data packet to determine if the source IP address matches one of the stored source IP addresses, and if there is a match, to either discard or forward the data packet depending on the processor configuration. Since operating system 39 and processor 38 are dedicated to one task, packet filter processor 14 can perform the filtering process very quickly and efficiently. The operation of operating system 39, and of packet filter processor 14 in general, will be described in more detail with reference to FIG. 3.

Another reason packet filter processor 14 is so efficient is that packet filter processor 14 is implemented between the physical layer and data link layer of the ISO 7498 protocol stack. The significance of this implementation can be better appreciated in view of some background information of network architectures in general.

A network architecture defines protocols, message formats, and standards to which products must conform in order to connect properly with the network. Architectures are developed by standards organizations, common carriers, and a computer and network vendors. Network architectures use a layered approach, whereby functions are organized into groups and assigned to specific functional layers in the architecture. Network architectures define the interfaces between layers in a given network node and within the same layer in two different nodes.

OSI provides a generalized model of system interconnection. It encompasses seven layers: application, presentation, session, transport, network, data link, and physical. A brief summary for each layer is given as follows:

1. Physical Layer

The physical layer is responsible for the transmission of bit stream across a particular physical transmission medium. It involves a connection between two machines that allows electrical signals to be exchanged between them.

2. Data Link Layer

The data link layer is responsible for providing reliable data transmission from one node to another and for shielding higher layers form any concerns about the physical transmission medium. It is concerned with the error free transmission of frames of data.

3. Network Layer

The network layer is concerned with routing data from one network node to another. It is responsible for establishing, maintaining, and terminating the network connection between two users and for transferring data along that connection.

4. Transport Layer

The transport layer is responsible for providing data transfer between two users at an agreed on level of quality.

5. Session Layer

The session layer focuses on providing services used to organize and synchronize the dialog that takes place between users and to manage data exchange.

6. Presentation Layer

The presentation layer is responsible for the presentation of information in a way that is meaningful to the network users, e.g., character code translation, data conversion, or data compression or expansion.

7. Application Layer

The application layer provides a means for application processes to access the system interconnection facilities in order to exchange information.

Packet filter processor 14 is implemented between the physical layer and data link layers described above, in order to increase the speed at which packets are filtered. The physical layer is responsible for data encoding and decoding. Data encoding refers to translating the bits being transmitted into the proper electrical signals to be sent across the transmission medium. Data decoding translates the electrical signals received over the transmission medium into the bit stream those signals represent. The data link layer is concerned with data encapsulation/decapsulation and media access management. These functions, however, are not necessary for identifying the source address of the packet. For example, data decapsulation is the function of recognizing the destination address, determining if it matches the receiving station's address, performing error checking, and removing control information that was added by the data encapsulation function in the sending station. Therefore, by implementing packet filter processor 14 between the physical layer and data link layer, processor 14 can maximize the speed at which it filters each packet.

Figure 3:
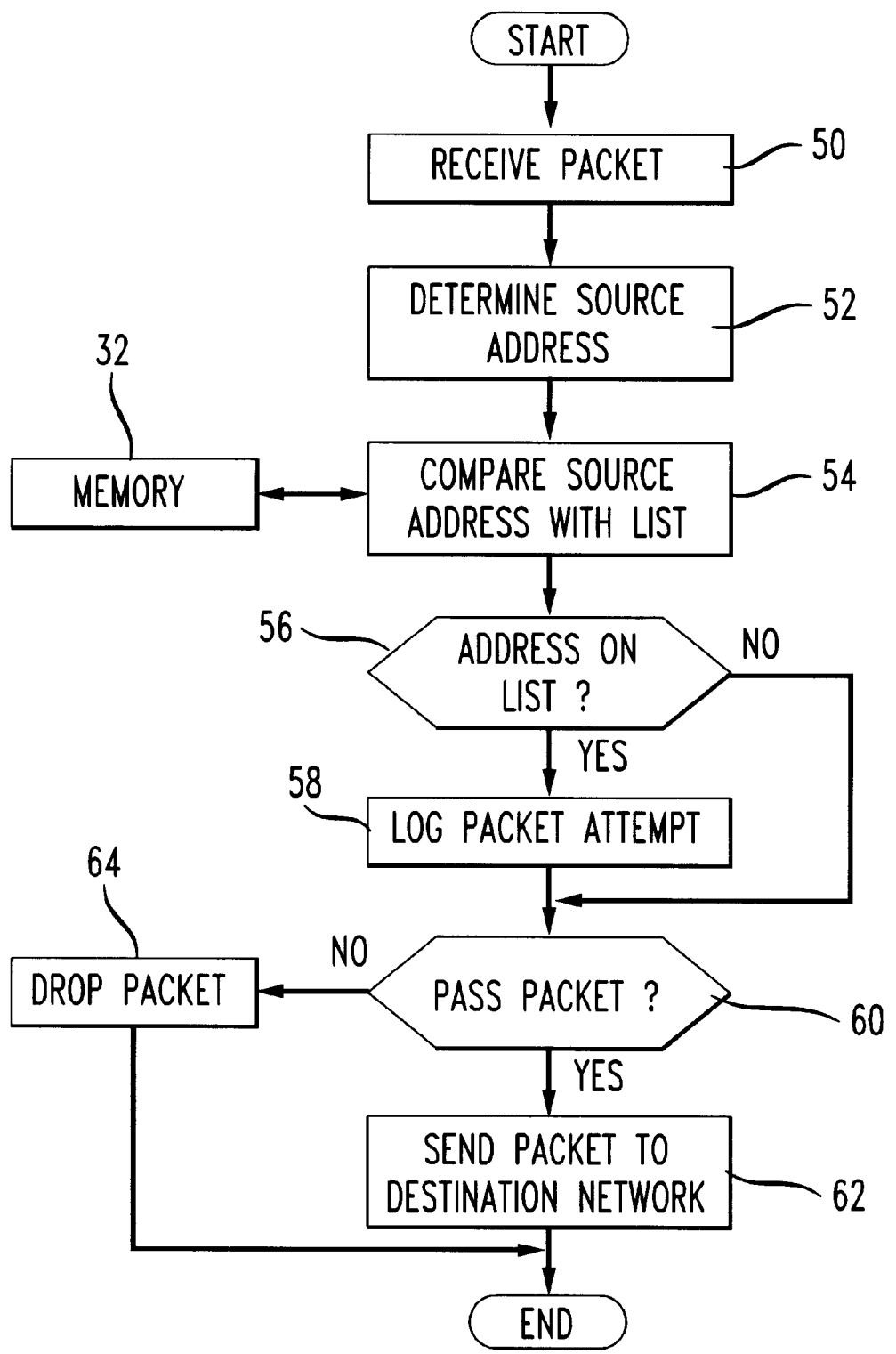
FIG. 3 is a block flow diagram of steps for filtering data packets in accordance with one embodiment of the invention.

FIG. 3 illustrates a block flow diagram of steps for filtering data packets in accordance with one embodiment of the invention. The description with respect to FIG. 3 will assume that a packet is originating from network 10 and has an intended destination address that is within network 16. It can be appreciated, however, that the operation of packet filter processor 14 is identical when the packet originates from network 16 or terminal 18 and has an intended destination address within network 10.

Packet filter processor 14 receives a packet at step 50. Connector 20 receives the packet and passes the packet to interface card 22 which is designed to convert the electrical impulses received over the physical transmission media into packets conforming to the standards set forth in IEEE 802.3. The packet is stored in FIFO 24.

Processor 38 reads the source IP address for the packet at step 52, and compares the source IP address with list 33, which is stored in DRAM bank 32, at step 54. List 33 is stored in DRAM bank 32 in order to increase the speed at which data from the list could be retrieved by processor 38, as compared to, e.g., when data is stored on some other computer readable medium such as a hard drive or floppy disk. Step 56 comprises a test to determine whether there is a match at step 54. If there is a match at step 54, then packet filter processor 58 records the attempt at step 58 before passing control to step 60. If there is not a match at step 54, then control is directly passed to step 60.

Packet filter processor 14 determines whether the packet should be passed at step 60. The decision whether to pass the packet or not is dependent upon the mode in which processor 14 is currently configured. Packet filter processor 14 has a restrictive mode and a permissive mode. Restrictive mode refers to a condition where a select number of packets are to be passed, and all others blocked. Permissive mode is where all packets are to be passed except for a select few that require blocking. Thus, in permissive mode, the packet is passed if the source IP address for a packet does not match an address on list 33. If there is a match, packet filter processor 14 drops the packet. In restrictive mode, the packet is passed if the source IP address does match an address from list 33, and is dropped otherwise.

At step 60, packet filter processor 14 determines whether the packet should be passed depending on whether processor 14 has been set to permissive mode or restrictive mode. If processor 14 has been set to restrictive mode, and there is a match at step 56, then the packet is passed at step 62 to the destination network which in this embodiment of the invention is network 16 or terminal 18. If processor 14 has been set to restrictive mode, and there is not a match at step 56, then the packet is dropped at step 64. Conversely, if processor 14 has been set to permissive mode, and there is a match at step 56, then the packet is dropped at step 64. If processor 14 has been set to permissive mode, and there is not a match at step 56, then the packet is passed to the destination network at step 62. In this embodiment of the invention, a default condition is that no feedback is given to the system sending the packets for security reasons if a packet is dropped at step 64. It can be appreciated, however, that this default condition can be changed and still fall within the scope of the invention.

In accordance with the system administration aspects of the invention, a service provider administers a database of source IP address lists. Each list may contain the IP addresses of particular types of Internet sites. The service provider keeps these lists up to data and periodically updates list 33 stored in DRAM bank 32 of packet filter processor 14. In this manner, end users can be assured that the source IP address lists stored in their filtering processor are up to date.

List 33 can be updated in at least two ways. First, list 33 could be updated by connecting Data Terminal Equipment (DTE) such as an asynchronous (ASCII) terminal (or personal computer emulating an asynchronous terminal) to RS-232 connector 34 of packet filter processor 14. This method would enhance security when updating list 33.

Alternatively, a network connection is formed with a central administrative site equipped with a list server 70, preferably through an Internet Service Provider (ISP) using a direct network connection or via RS-232 connector 34.

List 33 is then updated from the central administrative site, either by a request by the list server 70 of the administrative site, or on the request of packet filter processor 14. List server 70 is described in more detail with reference to FIG. 4.

Figure 4:
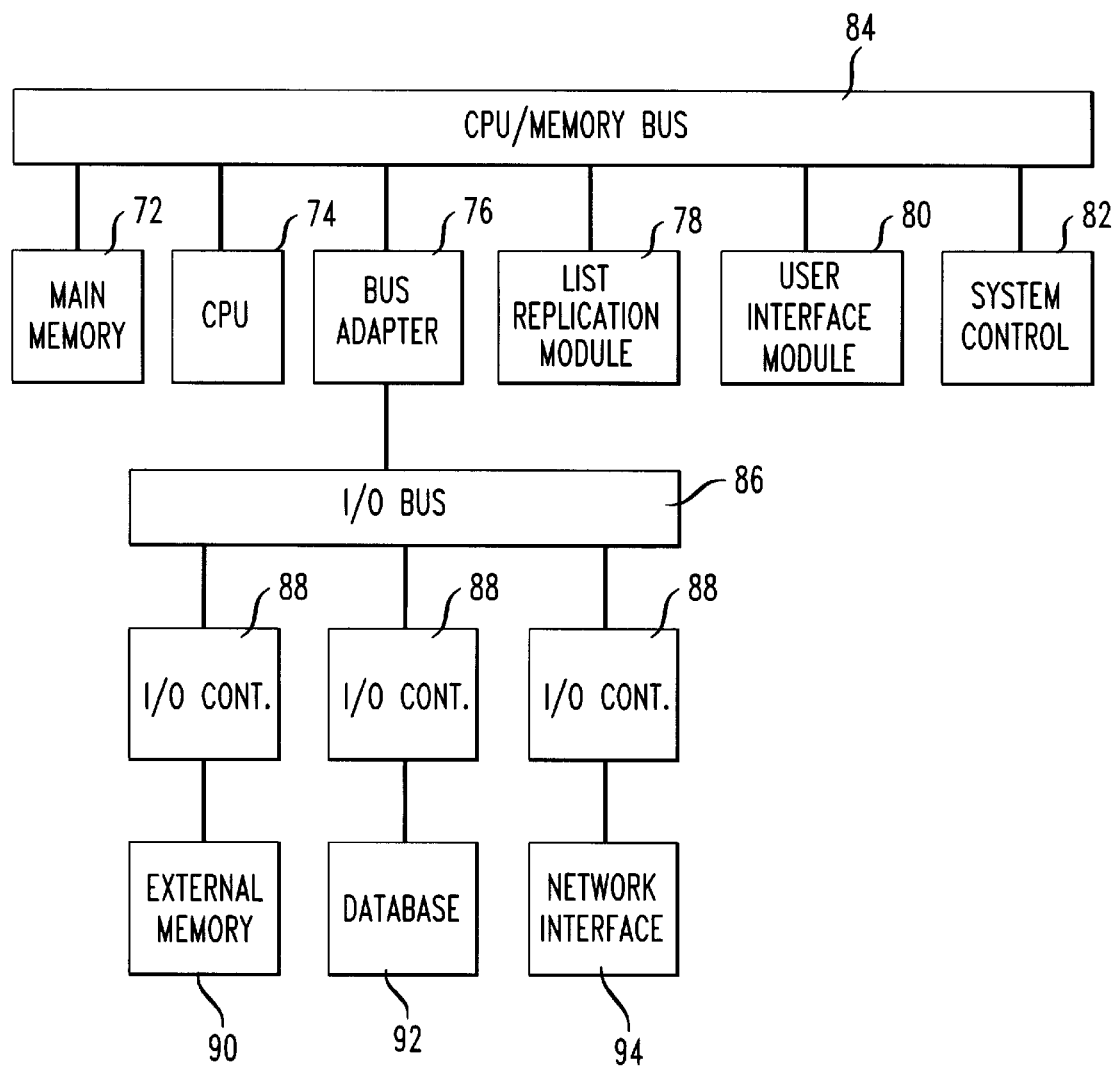
FIG. 4 is a block diagram of a list server in accordance with one embodiment of the invention.

FIG. 4 is a block diagram of a list server suitable for practicing one embodiment of the invention. List server 70 comprises a main memory module 72, a central processing unit (CPU) 74, a system control module 82, a bus adapter 76, a list replication module 78, and a user interface module 80, each of which is connected to a CPU/memory bus 84 and an Input/Output (I/O) bus 86 via bus adapter 76. Further, list server 70 contains multiple I/O controllers 88, as well as an external memory 90, a database 92 and network interface 94, each of which is connected to I/O bus 86 via I/O controllers 88.

The overall functioning of list server 70 is controlled by CPU 74, which operates under the control of executed computer program instructions that are stored in main memory 72 or external memory 90. Both main memory 72 and external memory 90 are machine readable storage devices. The difference between main memory 72 and external memory 90 is that CPU 74 can typically access information stored in main memory 72 faster than information stored in external memory 90. Thus, for example, main memory 72 may be any type of machine readable storage device, such as random access memory (RAM), read only memory (ROM), programmable read only memory (PROM), erasable programmable read only memory (EPROM), electronically erasable programmable read only memory (EEPROM). External memory 90 may be any type of machine readable storage device, such as magnetic storage media (i.e., a magnetic disk), or optical storage media (i.e., a CD-ROM). Further, list server 70 may contain various combinations of machine readable storage devices through other I/O controllers, which are accessible by CPU 74, and which are capable of storing a combination of computer program instructions and data.

CPU 74 includes any processor of sufficient processing power to perform the functionality found in list server 70. Examples of CPUs suitable to practice the invention includes the INTEL family of processors, such as the Pentium®, Pentium® Pro, and Pentium® II microprocessors.

Network interface 94 is used for communications between list server 70 and a communications network, such as the Public Switched Telephone Network (PSTN) or the Internet. Network interface 94 supports appropriate signaling, ringing functions and voltage levels, in accordance with techniques well known in the art.

I/O controllers 88 are used to control the flow of information between list server 70 and a number of devices or networks such as external memory 90, database 92 and network interface 94. System control module 82 includes human user system control and operation. Bus adapter 76 is used for transferring data back and forth between CPU/memory bus 84 and I/O bus 86.

List replication module 78 and user interface module 80 implements the main functionality for list server 70. It is noted that modules 78 and 80 are shown as separate functional modules in FIG. 4. It can be appreciated, however, that the functions performed by these modules can be further separated into more modules, combined together to form one module, or be distributed throughout the system, and still fall within the scope of the invention. Further, the functionality of these modules may be implemented in hardware, software, or a combination of hardware and software, using well-known signal processing techniques.

List server 70 operates as follows. A profile is established for each packet filter processor customer subscribing to the list updating service. The profile contains a copy of list 33 for each packet filter processor. List 33 at list server 70 is updated with new source IP addresses on a periodic basis. Similarly, old or invalid source IP addresses are removed from list 33 on a periodic basis.

The updating of list 33 at list server 70 can be accomplished in two ways. First, the central administrator for list server 70 obtains new source IP address information from various sources, such as service providers or search robots specializing in gathering source IP addresses by category, e.g., telemarketers, adult material, advertising entities, hate groups, and so forth. The central administrator for list server 70 then updates list 33 at list server 70 with the new source IP address information in a timely manner, e.g., within hours of receiving the new information. Second, the user of a packet filter processor can access list server 70 via user interface module 80, and perform updates to list 33 at list server 70 directly. The user could update list server 70 in a variety of ways, such as adding, deleting or modifying the source IP addresses of list 33 stored in database 92 of list server 70.

Once list 33 at list server 70 is updated, list replication module sends updated list 33 to each packet filter processor according to the profile of each packet filter processor. The profile for each packet filter processor contains information regarding when and how often list 33 at list server 70 is to be replicated to the packet filter processor. For example, list 33 at list server 70 can be replicated to a packet filter processor on a periodic basis, such as every day at a certain time, or whenever a change to list 33 at list server 70 is performed. In addition, a user of a packet filter processor may request an update of list 33, such as when the user has modified list 33 at server 70, or in the event list 33 at the packet filter processor has become corrupted or lost.

In addition to updating existing lists for packet filter processors, list server 70 has predetermined lists of source IP addresses by category. For example, a list of source IP addresses for all Internet sites containing adult material can be pre-established, and therefore readily replicated to a packet filter processor by a user simply accessing the central administrative site and making a request. Other lists for telemarketing firms, non-business related web sites, a competitor's network devices, government web sites, and so forth, could also be pre-established and made available for a user of the packet filter processor.

Although various embodiments are specifically illustrated and described herein, it will be appreciated that modifications and variations of the present invention are covered by the above teachings and within the purview of the appended claims without departing from the spirit and intended scope of the invention. For example, although a specific network topology has been illustrated in FIG. 1, it can be appreciated that any type of network configuration would be suitable for practicing the various embodiments of the present invention. In another example, although specific equipment was illustrated in FIG. 2 for a particular type of medium access technique, it can be appreciated that the packet filter processor shown in FIG. 2 can be modified to include equipment for any type of medium access technique, such as IEEE 802.2, 802.4, 802.5, 802.12 and so forth, and still fall within the scope of the invention.

What is claimed is:

1. An apparatus for filtering packets sent from a first network to a second network, comprising:
    an input means coupled to said first network for receiving data packets from the first network, said data packets having an origination address;

a first buffer coupled to said input means for storing said received packet;

a first memory segment containing a list of origination addresses;

a second memory segment for storing an operating system program for comparing origination addresses for said received data packets with said list;

a processor coupled to said first buffer, said first memory segment and said second memory segment for executing said operating system program in between physical layer and data link layer of a protocol stack followed by said processor; and an output means coupled to said first buffer for forwarding said compared data packets to the second network based on said comparison.

2. The apparatus of claim 1, further comprising a second buffer for storing said compared data packets prior to forwarding said compared data packets to the second network.

3. The apparatus of claim 2, wherein said first memory comprises dynamic random access memory.

4. The apparatus of claim 3, further comprising a non-volatile random access memory for storing parameters used by said operating system program.

5. The apparatus of claim 4, further comprising means for receiving an updated list of origination addresses.

6. The apparatus of claim 5, wherein said means for receiving comprises an asynchronous terminal device and a serial port coupled to said dynamic random access memory.

7. The apparatus of claim 5, wherein said means for receiving comprises a network interface card coupled to said dynamic random access memory.

8. The apparatus of claim 1, wherein said first network is a fixed wireless network, and said input means comprises means for receiving said data packets from said fixed wireless network.

9. The appartus of claim 1, wherein said output means comprises means for forwarding data packets to a single end user terminal.

10. The apparatus of claim 1, wherein said second network is a local area network, and said output means comprises means for forwarding data packets to a said local area network.

11. An apparatus for filtering packets sent from a first network to a device, comprising:

an input means coupled to said first network for receiving data packets from the first network, said data packets having an origination address;

a first buffer coupled to said input means for storing said received packet;

a first memory segment containing a list of origination addresses;

a second memory segment for storing an operating system program for comparing origination addresses for said received data packets with said list;

a processor coupled to said first buffer, said first memory segment and said second memory segment for executing said operating system program in between physical layer and data link layer of a protocol stack followed by said processor; and an output means coupled to said first buffer for forwarding said compared data packets to the device based on said comparison.

12. A method for filtering a packet sent from a first network to a second network, comprising:

receiving a data packet from the first network;

determining an origination address for said data packet;

comparing the origination address for said received data packet with a list of origination addresses, wherein said comparing is performed in between physical layer and data link layer of a protocol stack followed by said processor; and determining whether to forward said compared data packet to the second network based on said comparison.

13. The method of claim 12, further comprising:

forwarding said compared data packet to the second network if the origination address for said compared data packet matches an origination address on the list of origination addresses.

14. The method of claim 12, further comprising:

forwarding said compared data packet to the second network if the origination address for said compared data packet does not match an origination address on the list of origination addresses.

15. The method of claim 12, further comprising:

determining not to forward said compared data packet to the second network if the origination address for said compared data packet does not match an origination address on the list of origination addresses.

16. The method of claim 15, further comprising:

discarding said compared data packet.

17. The method of claim 12, further comprising:

determining not to forward said compared data packet to the second network if the origination address for said compared data packet matches an origination address on the list of origination addresses.

18. The method of claim 17, further comprising:

discarding said compared data packet.

19. The method of claim 12, further comprising:

recording said step of comparing if the origination address for said received data packet matches an origination address on the list of origination addresses.

20. The method of claim 12, further comprising:

receiving an updated list of origination addresses.

21. A method for filtering a packet sent from a first network to a device, comprising:

receiving a data packet from the first network;

determining an origination address for said data packet;

comparing the origination address for said received data packet with a list of origination addresses, wherein said comparing is performed in between physical layer and data link layer of a protocol stack followed by said processor; and determining whether to forward said compared data packet to the device based on said comparison.

* * * * *